United States Patent [19]

Murase et al.

[11] 4,405,480
[45] Sep. 20, 1983

[54] DIELECTRIC CERAMIC MATERIALS WITH INSULATED BOUNDARIES BETWEEN CRYSTAL GRAINS, AND PROCESS FOR PREPARATION

[75] Inventors: Kiyoshi Murase, Takasaki; Nobutatsu Yamaoka, Harunamachi; Kazuji Onigata, Annaka, all of Japan

[73] Assignee: Taiyo Yuden Co., Ltd., Tokyo, Japan

[21] Appl. No.: 443,783

[22] Filed: Nov. 22, 1982

[30] Foreign Application Priority Data

Dec. 16, 1981 [JP] Japan .................................. 56-201695
Sep. 28, 1982 [EP] European Pat. Off. ......... 82108979.4

[51] Int. Cl.³ .......................... C04B 35/46; H01B 3/12
[52] U.S. Cl. .............................. 252/62.3 BT; 252/520; 252/521; 501/136
[58] Field of Search ............... 501/136; 252/62.3 GA, 252/62.3 ZT, 62.3 BT, 62.3 ZB, 520, 521

[56] References Cited

U.S. PATENT DOCUMENTS 3,933,668 1/1976 Takahashi et al. ................. 501/136

FOREIGN PATENT DOCUMENTS 55-44445 11/1980 Japan .

Primary Examiner—Mark Bell
Attorney, Agent, or Firm—Woodcock, Washburn, Kurtz, Mackiewicz & Norris

[57] ABSTRACT

A dielectric ceramic material composed of primary and secondary ingredients forming in combination a polycrystalline ceramic proper, and of insulating substances diffused throughout the intergranular boundaries of the ceramic proper for an increase in apparent relative dielectric constant. The primary ingredients comprise, in relative proportions, 93.18–99.85 wt. % $SrTiO_3$, 0.13–5.32 wt. % $Nb_2O_5$, and 0.02–1.50 wt. % CuO. The secondary ingredients comprise 0.02–0.10 wt. part $SiO_2$ and 0.01–0.03 wt. part $Al_2O_3$ with respect to 100 wt. parts of the primary ingredients, with the weight ratio of $SiO_2$ to $Al_2O_3$ being from 1.5 to 5.0. The insulating substances comprise 0.03–2.75 wt. % PbO, 0.12–4.23 wt. % $Bi_2O_3$, and 0.001–0.18 wt. % $B_2O_3$ with respect to the total weight of the primary and the secondary ingredients. In the fabrication of bodies of the ceramic the mixture of the insulating substances is coated or otherwise layered on polycrystalline ceramic bodies prepared from the primary and secondary ingredients. The coated ceramic bodies are then heated to cause diffusion of the insulating substances throughout their intergranular boundaries.

1 Claim, 2 Drawing Figures

DIELECTRIC CERAMIC MATERIALS WITH INSULATED BOUNDARIES BETWEEN CRYSTAL GRAINS, AND PROCESS FOR PREPARATION

BACKGROUND OF THE INVENTION

Our invention relates to ceramic materials in general and, in particular, to those composed principally of strontium titanate ($SrTiO_3$) and especially well suited for use as dielectrics of capacitors. Still more particularly, our invention pertains to ceramic materials of polycrystalline structure having electrically insulated boundaries between the crystal grains with a view to an increase in apparent relative dielectric constant. The invention also particularly concerns a process for the fabrication of coherent bodies of such ceramic materials.

The polycrystalline ceramics having insulated intergranular boundaries are generally referred to as the "boundary layer ceramics" in the art. An example is described and claimed in U.S. Pat. No. 3,933,668 issued to Takahashi et al. on Jan. 20, 1976. The boundary layer ceramic according to this U.S. patent consists essentially of a major proportion of $SrTiO_3$, a minor proportion of niobium oxide ($Nb_2O_5$) or tantalum oxide ($Ta_2O_5$), and a minor proportion of germanium dioxide ($GeO_2$) or zinc oxide ($ZnO$). The polycrystalline ceramic of this fundamental composition has further diffused therein bismuth trioxide ($Bi_2O_3$) or its admixture with lead monoxide ($PbO$) and boron oxide ($B_2O_3$) for the insulation of the boundaries between its crystal grains.

An objection to this known boundary layer ceramic is that its crystal grains average in diameter only from about 40 to 60 micrometers. Its apparent relative dielectric constant is therefore up to 75,000 or so. Although this value is satisfactory for most intended applications of the material, there are strong demands today for ceramics with still higher relative dielectric constants.

SUMMARY OF THE INVENTION

Our invention meets the present day demands for ceramics with such extremely high relative dielectric constants by making the crystal grains of boundary layer ceramics much greater in size than in the prior art.

The invention may be summarized as a boundary layer ceramic having insulated boundaries between its constituent crystal grains, composed of primary and secondary ingredients forming in combination a polycrystalline ceramic proper, and insulating substances dispersed in the intergranular boundaries of the ceramic proper. The primary ingredients comprise approximately 93.18 to 99.85 percent by weight $SrTiO_3$, approximately 0.13 to 5.32 percent by weight $Nb_2O_5$, and approximately 0.02 to 1.5 percent by weight black copper oxide ($CuO$), the percentages of these primary ingredients being relative to each other. The secondary ingredients comprise approximately 0.02 to 0.10 part by weight silica ($SiO_2$) and approximately 0.01 to 0.03 part by weight aluminum oxide ($Al_2O_3$) with respect to 100 parts by weight of the listed primary ingredients, the ratio in weight of $SiO_2$ to $Al_2O_3$ being approximately from 1.5 to 5.0. The insulating substances comprise approximately 0.03 to 2.75 percent by weight $PbO$, approximately 0.12 to 4.23 percent by weight $Bi_2O_3$, and approximately 0.001 to 0.18 percent by weight $B_2O_3$. The percentages of the insulating substances are all with respect to the total weight of the noted primary and secondary ingredients in use.

Of the above ingredients of the boundary layer ceramics in accordance with our invention, the niobium oxide ($Nb_2O_5$) functions principally to make the ceramics semiconductive. The black copper oxide ($CuO$) is effective primarily to accelerate the growth of the crystal grains.

Used in the above specified ranges of proportions, the secondary ingredients $SiO_2$ and $Al_2O_3$ both serve to make the crystal grains of the ceramics greater in size than hitherto, namely from 60 to 120 micrometers in diameter. Generally, the greater the crystal grains of ceramics in size, the higher are their relative dielectric constants. The apparent relative dielectric constants of the ceramics in accordance with our invention are well over 80,000. As has been ascertained by experiment, moreover, the dielectric loss tangents (the tangents of the dielectric loss angles) of the ceramics in accordance with our invention are less than one percent ($1 \times 10^{-2}$), and their resistivities are over $1.0 \times 10^{11}$ ohm-centimeters. The ceramics with these characteristics are admirably well suited for use as dielectrics of capacitors.

It will of course be understood that the listed ingredients of the ceramics in accordance with our invention perform not just the above recited functions by themselves. They intricately interact to make up the ceramics of the highly favorable electrical properties.

Our invention also provides a method of fabricating coherent bodies of the above ceramic compositions. The method dictates the preparation, first of all, of uninsulated ceramic bodies composed of the primary and secondary ingredients set forth previously. Then the three insulating substances, $PbO$, $Bi_2O_3$ and $B_2O_3$, are suitably layered on the uninsulated ceramic bodies, which are then heated to cause diffusion of the insulating substances throughout the intergranular boundaries of the ceramic bodies.

Preferably, the uninsulated ceramic bodies are prepared by firing moldings of the primary and secondary ingredients in a reductive atmosphere. On these uninsulated ceramic bodies are then coated a paste of the insulating substances. Then the coated bodies are heated in an oxidative atmosphere to cause diffusion of the insulating substances. The use of a rubber-lined bowl mill is recommended for blending together the primary and secondary ingredients, as it makes possible the accurate proportioning of $Si_2O_3$ and $Al_2O_3$, which is essential to increase the size of the crystal grains to a desired degree.

The above and other features and advantages of this invention and the manner of attaining them will become more apparent, and the invention itself will best be understood, from a study of the following description taken together with the attached drawings, in which:

DETAILED DESCRIPTION

Figure 1:
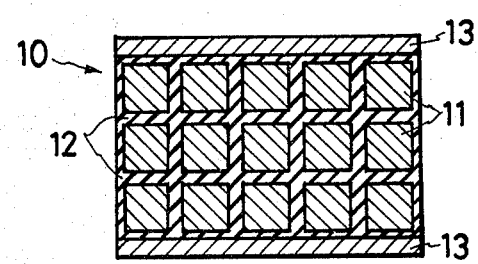
FIG. 1 is a highly diagrammatic section through a body of insulated boundary layer ceramic material in accordance with our invention, the ceramic body being shown electroded for use as a capacitor.

Although the showing of FIG. 1 is highly diagrammatic, it will nevertheless be seen that the boundary layer ceramic body 10 of our invention is of polycrystalline structure, composed of an aggregate of semiconductive crystal grains 11 isolated from one another by boundary layers 12. Diffused throughout these boundary layers are PbO, $Bi_2O_3$ and $B_2O_3$ which serve to insulate the crystal grains 11 from one another. The ceramic body 10 can be converted into a capacitor by being electroded as at 13. These electrodes may be formed by coating a commercial silver paste on the opposite faces of the ceramic body 10 and then by firing the coatings.

Presented hereinbelow are Examples dealing with specific compositions of the insulated boundary layer ceramics, method of their preparation, and electrical properties of capacitors made with use of the ceramics. As will be specifically pointed out in the course of the description of these Examples, some of them fall outside the purview of our invention. Such noninventive Examples are given to clearly distinguish the advantages of our invention and to give support to the claimed numerical limitations.

Hereinafter in this specification all percentages and parts are by weight unless otherwise specified.

EXAMPLES 1-34

$SrTiO_3$ of the industrial grade (containing practically negligible amounts of impurities such as barium, iron, manganese, calcium, sodium and potassium) was admixed with two other primary ingredients $Nb_2O_5$ and CuO and the secondary ingredients $SiO_2$ and $Al_2O_3$ in various sets of proportions specified in Table 1. In order to avoid intrusion of foreign matter, these admixtures were blended wet in a rubber-lined bowl mill. After being dried, the admixtures were pasted with polyvinyl alcohol, an organic binder, and the pastes were formed into test discs. Then the test discs were heated to and held at 1000° C. for one hour thereby removing the binder therefrom by evaporation. Then the test discs were fired in a temperature range of 1350° C. to 1450° C. for two to four hours in a weakly reductive atmosphere of 99 percent by capacity of molecular nitrogen ($N_2$) and one percent by capacity of molecular hydrogen ($H_2$). Thus were prepared the semiconductive ceramic test discs each having a diameter of approximately eight millimeters and a thickness of approximately 0.4 millimeter.

The test discs are polycrystalline, comprising a myriad of crystal grains 11 as in FIG. 1. These crystal grains are, however, not yet insulated from one another, so that we will refer to the discs at this stage as the uninsulated ceramic test discs. It will be appreciated that the use of the rubber-lined bowl mill serves to prevent the introduction of impurities, as from a ceramic-made bowl, into the ceramic materials, making possible the precise proportioning of $SiO_2$ and $Al_2O_3$ which are both used in extremely small quantities.

Then, in order to insulate the crystal grains of the uninsulated ceramic test discs from each other, there was prepared a mixture of 50 percent PbO, 45 percent $Bi_2O_3$, and five percent $B_2O_3$, all in finely divided form. The mixture was pasted with nitrocellulose and butyl "Carbitol" (trademark for diethylene glycol mono-n-butyl ether). This paste was screen-printed on one face of each uninsulated ceramic test disc, at a rate of 10 milligrams (10 percent) for each 100 milligrams of the uninsulated ceramic test discs.

Then the coated test discs were heated to and held at a constant temperature in the range from 1150° C. to 1300° C. for two hours in a oxidizing atmosphere. This heat treatment caused diffusion of PbO, $Bi_2O_3$ and $B_2O_3$ throughout the intergranular boundaries of the ceramic test discs. The insulated boundary layers thus formed are indicated at 12 in FIG. 1. Thus was completed the fabrication of the insulated boundary layer ceramic test discs in accordance with our invention.

For testing the electrical properties of the test discs, these were further processed into test capacitors by coating a commercial silver paste on their opposite faces and by firing them. FIG. 1 shows at 13 the pair of electrodes thus formed on each test disc.

In the foregoing process of the fabrication of the insulated boundary layer ceramic test discs, the secondary ingredients $SiO_2$ and $Al_2O_3$ are both wholly retained in the completed products in the initial proportions. However, the insulating substances PbO, $Bi_2O_3$ and $B_2O_3$ partly evaporate on being heated after having been coated on the uninsulated ceramic test discs, the remainders of the substances being diffused in the intergranular boundaries of the test discs. The remaining (actually diffused) percentages of the insulating substances are subject to change depending upon the substances themselves and on the compositions of the test discs. In these particular Examples the PbO remained at rates ranging from 0.28 to 0.86 milligram (0.28 to 0.86 percent), the $Bi_2O_3$ at rates ranging from 0.49 to 1.50 milligrams (0.49 to 1.50 percent), and the $B_2O_3$ at rates ranging from 0.01 to 0.06 milligram (0.01 to 0.06 percent), for each 100 milligrams of the test discs.

The boundary layer ceramic test capacitors prepared as above were tested as to apparent relative dielectric constants ($\epsilon$), dielectric loss tangents (tan $\delta$), and resistivities ($\rho$). Table 1 gives the results. In this and all the following tables each listed value is the average of 30 samples. Also, in all the tables given herein, relative dielectric constants and dielectric loss tangents were both measured at one kilo-hertz, and resistivities were measured upon lapse of one minute after application of a direct current at 50 volts. The dielectric loss tangents in the tables are expressed in percent; therefore, for the actual values, the tabulated figures should be multiplied by $10^{-2}$.

It will also be noted from Table 1 that the percentages of the three primary ingredients, $SrTiO_3$, $Nb_2O_5$ and CuO, sum up to 100 in each Example. The same holds true with the various combinations of three principal ingredients employed in all the Examples given in the subsequent tables. Further, in this and all the following tables, the proportions of the secondary ingredients $SiO_2$ and $Al_2O_3$ are expressed in parts with respect to 100 parts of the three primary ingredients combined.

TABLE 1

| Examples | Primary ingredients (100 wt. parts) | | | Secondary ingredients | | | Electrical properties | | |
|---|---|---|---|---|---|---|---|---|---|
| | SrTiO$_3$, wt. % | Nb$_2$O$_5$, wt. % | CuO wt. % | SiO$_2$, wt. part | Al$_2$O$_3$, wt. part | $\frac{SiO_2}{Al_2O_3}$ | $\epsilon$, $\times 10^4$ | tan $\delta$, % | $\rho$, $\times 10^{11}$ $\Omega$-cm |
| 1 | 98.80 | 0.70 | 0.50 | — | — | — | 6.4 | 0.3 | 1.7 |
| 2 | 98.37 | 0.13 | 1.50 | 0.024 | 0.028 | 0.9 | 6.0 | 0.6 | 1.7 |
| 3 | 97.25 | 2.70 | 0.05 | 0.020 | 0.020 | 1.0 | 6.3 | 0.5 | 1.7 |
| 4 | 99.85 | 0.13 | 0.02 | 0.040 | 0.030 | 1.3 | 5.9 | 0.6 | 1.7 |
| 5 | 94.66 | 5.32 | 0.02 | 0.024 | 0.018 | 1.3 | 6.0 | 0.5 | 1.7 |
| 6 | 98.30 | 0.30 | 1.40 | 0.034 | 0.025 | 1.4 | 6.1 | 0.5 | 1.7 |
| 7 | 93.18 | 5.32 | 1.50 | 0.015 | 0.010 | 1.5 | 6.0 | 0.3 | 1.7 |
| 8 | 99.70 | 0.25 | 0.05 | 0.021 | 0.014 | 1.5 | 8.2 | 0.3 | 1.6 |
| 9 | 98.37 | 0.13 | 1.50 | 0.030 | 0.020 | 1.5 | 8.6 | 0.4 | 1.6 |
| 10 | 94.66 | 5.32 | 0.02 | 0.045 | 0.030 | 1.5 | 8.3 | 0.5 | 1.6 |
| 11 | 98.80 | 0.70 | 0.50 | 0.040 | 0.025 | 1.6 | 9.7 | 0.5 | 1.5 |
| 12 | 94.75 | 4.50 | 0.75 | 0.060 | 0.035 | 1.7 | 6.4 | 0.6 | 1.7 |
| 13 | 99.85 | 0.13 | 0.02 | 0.052 | 0.028 | 1.9 | 8.9 | 0.5 | 1.6 |
| 14 | 93.18 | 5.32 | 1.50 | 0.020 | 0.010 | 2.0 | 8.4 | 0.3 | 1.6 |
| 15 | 94.75 | 4.50 | 0.75 | 0.043 | 0.020 | 2.2 | 9.8 | 0.3 | 1.5 |
| 16 | 97.25 | 2.70 | 0.05 | 0.070 | 0.030 | 2.3 | 9.7 | 0.4 | 1.5 |
| 17 | 98.37 | 0.13 | 1.50 | 0.078 | 0.031 | 2.5 | 5.7 | 0.6 | 1.7 |
| 18 | 94.66 | 5.32 | 0.02 | 0.032 | 0.012 | 2.7 | 8.4 | 0.4 | 1.6 |
| 19 | 93.18 | 5.32 | 1.50 | 0.095 | 0.035 | 2.7 | 5.9 | 0.6 | 1.7 |
| 20 | 99.70 | 0.25 | 0.05 | 0.060 | 0.020 | 3.0 | 10.1 | 0.4 | 1.5 |
| 21 | 99.85 | 0.13 | 0.02 | 0.090 | 0.028 | 3.2 | 9.3 | 0.5 | 1.5 |
| 22 | 94.75 | 4.50 | 0.75 | 0.100 | 0.030 | 3.3 | 9.1 | 0.5 | 1.5 |
| 23 | 94.66 | 5.32 | 0.02 | 0.102 | 0.026 | 3.9 | 6.0 | 0.6 | 1.7 |
| 24 | 98.80 | 0.70 | 0.50 | 0.020 | 0.005 | 4.0 | 6.5 | 0.4 | 1.7 |
| 25 | 97.25 | 2.70 | 0.05 | 0.040 | 0.010 | 4.0 | 9.9 | 0.4 | 1.5 |
| 26 | 93.18 | 5.32 | 1.50 | 0.080 | 0.020 | 4.0 | 9.5 | 0.5 | 1.5 |
| 27 | 98.37 | 0.13 | 1.50 | 0.070 | 0.015 | 4.7 | 12.3 | 0.5 | 1.3 |
| 28 | 97.25 | 2.70 | 0.05 | 0.040 | 0.008 | 5.0 | 6.3 | 0.4 | 1.7 |
| 29 | 98.30 | 0.30 | 1.40 | 0.050 | 0.010 | 5.0 | 13.2 | 0.5 | 1.5 |
| 30 | 98.80 | 0.70 | 0.50 | 0.100 | 0.020 | 5.0 | 9.7 | 0.5 | 1.5 |
| 31 | 99.70 | 0.25 | 0.05 | 0.080 | 0.015 | 5.3 | 14.6 | 1.1 | 0.1 |
| 32 | 93.18 | 5.32 | 1.50 | 0.055 | 0.010 | 5.5 | 14.1 | 1.2 | 0.1 |
| 33 | 94.66 | 5.32 | 0.02 | 0.090 | 0.015 | 6.0 | 10.1 | 1.0 | 0.7 |
| 34 | 94.75 | 4.50 | 0.75 | 0.095 | 0.012 | 7.9 | 8.3 | 0.9 | 0.8 |

Of the thirty-four Examples of Table 1, Examples 8-11, 13-16, 18, 20-22, 25-27, 29 and 30 represent ceramic compositions complying with the teachings of our invention. The relative proportions of the three primary ingredients in use, SrTiO$_3$, Nb$_2$O$_5$ and CuO, of these Examples are from 93.18 to 99.85 percent, from 0.13 to 5.32 percent, and from 0.12 to 1.50 percent, respectively. Their SiO$_2$ and Al$_2$O$_3$ contents are from 0.02 to 0.10 part, and from 0.01 to 0.03 part, respectively, with respect to 100 parts of the primary ingredients. The ratios in weight of SiO$_2$ to Al$_2$O$_3$ are from 1.5 to 5.0.

The crystal grains of the ceramic test discs of the above inventive Examples averaged from 60 to 120 micrometers in diameter. As is seen from Table 1, the boundary layer ceramic test capacitors of the inventive Examples have apparent relative dielectric constants ranging from 82,000 to as high as 132,000, dielectric loss tangents of as small as 0.3 to 0.5 percent, and resistivities of 1.3 to 1.6$\times$10$^{11}$ ohm-centimeters.

The ceramic compositions of Examples 1-7, 12, 17, 19, 23, 24, 28 and 31-34, on the other hand, do not conform to the principles of our invention. A consideration of Table 1 will show that if the weight ratio of SiO$_2$ to Al$_2$O$_3$ is not more than 1.5, the apparent relative dielectric constants of the resulting capacitors fall short of 80,000. If this weight ratio exceeds 5.0, on the other hand, then the resulting capacitors have dielectric loss tangents of over 1.0 percent or resistivities of less than 1.0$\times$10$^{11}$ ohm-centimeters. Also, if the proportion of SiO$_2$ is less than about 0.02 part or more than about 0.10 part with respect to 100 parts of the primary ingredients, the apparent relative dielectric constants of the resulting capacitors become less than 80,000. The apparent relative dielectric constants do not exceed 80,000, either, if the proportion of Al$_2$O$_3$ is less than about 0.01 part or more than about 0.03 part.

We conclude from the above tabulated results that, for the boundary layer ceramics composed principally of SrTiO$_3$, Nb$_2$O$_5$ and CuO in accordance with our invention, the contents of the secondary ingredients SiO$_2$ and Al$_2$O$_3$ should be from about 0.02 to about 0.10 part, and from about 0.01 to about 0.03 part, respectively, with respect to 100 parts of the primary ingredients. Further the weight ratio of SiO$_2$ to Al$_2$O$_3$ should be from about 1.5 to about 5.0. Experiment has proved that capacitors of no favorable electrical properties are obtainable from boundary layer ceramics whose proportions of the three primary ingredients fall outside the ranges of our invention, even if their SiO$_2$ and Al$_2$O$_3$ contents and the weight ratios thereof are within the ranges of our invention.

Figure 2:
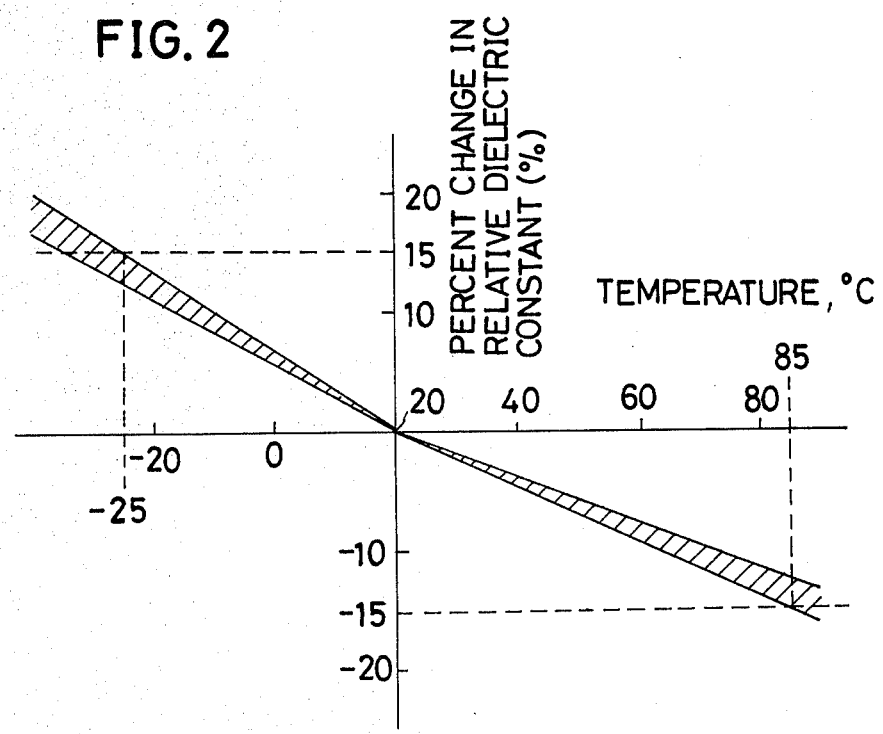
FIG. 2 is a graphic representation of the temperature dependencies of the relative dielectric constants of test pieces of various ceramic compositions in accordance with our invention.

We measured the temperature dependencies of the apparent relative dielectric constants of the above inventive Examples. The results were as graphically represented in FIG. 2. With the apparent relative dielectric constants at 20° C. taken as a criterion, the percent variations of the dielectric constants of all the tested Examples with temperatures fell within the hatched regions of the graph. That is, the percent variations of the dielectric constants were plus or minus 15 in the temperature range of −25° C. to +85° C.

EXAMPLES 35-70

Uninsulated ceramic test discs were fabricated by use of the same ingredients, and in the same proportions, as in Examples 9, 10, 14, 20, 21, 22, 29 and 30, and through the same procedure as in Examples 1–34. Then the three insulating substances, PbO, $Bi_2O_3$ and $B_2O_3$, in the various sets of proportions given in Table 2 were thermally diffused throughout the intergranular boundaries of the test discs through the same procedure as in Examples 1–34. The thus insulated boundary layer ceramic test discs were then processed into test capacitors through the same procedure as in Examples 1–34.

Measured by the same methods as in Examples 1–34, the three electrical properties in question of the above prepared test capacitors were as given in Table 2. In this table the column labelled "Ceramic" represents, of course, the uninsulated ceramics composed only of the primary ingredients $SrTiO_3$, $Nb_2O_5$ and CuO and the secondary ingredients $SiO_2$ and $Al_2O_3$.

TABLE 2

| Ex-am-ples | Ceramic | Insulating substances | | | Electrical properties | | |
| --- | --- | --- | --- | --- | --- | --- | --- |
| | | PbO, wt. % | $Bi_2O_3$, wt. % | $B_2O_3$, wt. % | $\epsilon$, $\times 10^4$ | tan $\delta$, % | $\rho$, $\times 10^{11}$ $\Omega$-cm |
| | Same as: | | | | | | |
| 35 | Example 9 | 34 | 56 | 10 | 7.9 | 0.6 | 1.7 |
| 36 | Example 9 | 38 | 57 | 5 | 8.0 | 0.6 | 1.7 |
| 37 | Example 9 | 45 | 45 | 10 | 9.0 | 0.5 | 1.6 |
| 38 | Example 9 | 54 | 44 | 2 | 9.9 | 0.5 | 1.6 |
| 39 | Example 10 | 35 | 58 | 7 | 8.0 | 0.7 | 1.7 |
| 40 | Example 10 | 39 | 52 | 9 | 8.2 | 0.6 | 1.7 |
| 41 | Example 10 | 47 | 52 | 1 | 8.5 | 0.7 | 0.5 |
| 42 | Example 10 | 50 | 40 | 10 | 8.6 | 0.6 | 1.6 |
| 43 | Example 14 | 35 | 55 | 10 | 8.0 | 0.6 | 1.7 |
| 44 | Example 14 | 40 | 59 | 1 | 8.0 | 1.1 | 0.6 |
| 45 | Example 14 | 45 | 47 | 8 | 8.1 | 0.5 | 1.6 |
| 46 | Example 14 | 54 | 40 | 6 | 8.3 | 0.4 | 1.6 |
| 47 | Example 20 | 35 | 58 | 7 | 9.4 | 0.5 | 1.6 |
| 48 | Example 20 | 45 | 52 | 3 | 10.2 | 0.5 | 1.5 |
| 49 | Example 20 | 50 | 40 | 10 | 10.4 | 0.4 | 1.5 |
| 50 | Example 20 | 52 | 43 | 5 | 9.9 | 0.4 | 1.5 |
| 51 | Example 20 | 55 | 40 | 5 | 10.1 | 0.5 | 0.8 |
| 52 | Example 21 | 34 | 59 | 7 | 7.9 | 1.1 | 1.7 |
| 53 | Example 21 | 40 | 58 | 2 | 8.6 | 0.6 | 1.6 |
| 54 | Example 21 | 45 | 45 | 10 | 9.6 | 0.5 | 1.5 |
| 55 | Example 21 | 54 | 44 | 2 | 8.8 | 0.6 | 1.6 |
| 56 | Example 22 | 38 | 57 | 5 | 8.5 | 0.7 | 1.7 |
| 57 | Example 22 | 40 | 49 | 11 | 9.3 | 1.2 | 1.3 |
| 58 | Example 22 | 45 | 52 | 3 | 8.5 | 0.1 | 1.6 |
| 59 | Example 22 | 50 | 40 | 10 | 8.6 | 0.5 | 1.6 |
| 60 | Example 22 | 54 | 40 | 6 | 9.0 | 0.5 | 1.5 |
| 61 | Example 29 | 35 | 55 | 10 | 12.5 | 0.6 | 1.6 |
| 62 | Example 29 | 40 | 58 | 2 | 12.3 | 0.7 | 1.6 |
| 63 | Example 29 | 45 | 47 | 8 | 12.7 | 0.5 | 1.5 |
| 64 | Example 29 | 52 | 43 | 5 | 12.9 | 0.5 | 1.5 |
| 65 | Example 29 | 54 | 45 | 1 | 11.7 | 0.8 | 0.3 |
| 66 | Example 30 | 35 | 59 | 6 | 8.8 | 1.3 | 1.5 |
| 67 | Example 30 | 35 | 55 | 10 | 9.2 | 0.6 | 1.5 |
| 68 | Example 30 | 45 | 52 | 3 | 9.0 | 0.5 | 1.5 |
| 69 | Example 30 | 52 | 43 | 5 | 9.5 | 0.5 | 1.5 |
| 70 | Example 30 | 51 | 39 | 10 | 9.6 | 0.6 | 0.6 |

In Examples 36–40, 42, 43, 45–50, 53–56, 58–64 and 67–69 of Table 2 the relative proportions of the insulating substances PbO, $Bi_2O_3$ and $B_2O_3$ are in the ranges from 35 to 54 percent, from 40 to 58 percent, and from two to 10 percent, respectively. The apparent relative dielectric constants of all these inventive Examples are sufficiently high, and their dielectric loss tangents and resistivities are also favorable. In Examples 35, 41, 44, 51, 52, 57, 65, 66 and 70, on the other hand, the relative proportions of PbO, $Bi_2O_3$ and $B_2O_3$ all fall outside the above ranges. All these noninventive Examples are unsatisfactory in one or more of the three electrical properties.

We conclude from the results of Table 2 that the ranges of the relative proportions of the three insulating substances PbO, $Bi_2O_3$ and $B_2O_3$ should be from about 35 to about 54 percent, from about 40 to about 58 percent, and from about two to about 10 percent, respectively, for the ceramic compositions now under consideration.

We measured the percentages of the insulating substances remaining diffused in the ceramic test discs of the above inventive Examples after the heat treatment. PbO remained at rates ranging from 0.07 to 1.76 percent, $Bi_2O_3$ at rates ranging from 0.24 to 2.70 percent, and $B_2O_3$ at rates ranging from 0.002 to 0.12 percent.

EXAMPLE 71

In this Example it was intended to ascertain the percentages of the three insulating substances to remain diffused in the boundary layer ceramics composed principally of $SrTiO_3$, $Nb_2O_5$ and CuO, for the provision of capacitors of favorable properties. The relative proportions of the insulating substances in use were within the ranges specified in connection with Examples 35–70. The pasted mixture of the insulating substances was coated on uninsulated ceramic test discs (prepared through the same procedure as in Examples 1–34, with the proportions of the ingredients in conformity with our invention) in various amounts ranging from one to 15 percent of the weight of the test discs. The coated discs were heated at various temperatures ranging from 1150° C. to 1300° C. for various lengths of time ranging from one to four hours, thereby preparing a number of insulated boundary layer ceramic test discs containing various amounts of the insulating substances. Then the test discs were processed into test capacitors through the same procedure as in Examples 1–34.

Of the thus fabricated test capacitors, those having an apparent relative dielectric constant of over 80,000, a dielectric loss tangent of not more than one percent, and a resistivity of not less than $1.0 \times 10^{11}$ ohm-centimeters were picked up. The PbO, $Bi_2O_3$ and $B_2O_3$ contents of these test capacitors with the favorable electrical properties ranged from 0.03 to 2.75 percent, from 0.12 to 4.23 percent, and from 0.001 to 0.18 percent, respectively, with respect to the weight of the uninsulated ceramic discs (i.e., those composed of the primary ingredients $SrTiO_3$, $Nb_2O_5$ and CuO and the secondary ingredients $SiO_2$ and $Al_2O_3$).

Although we have disclosed the boundary layer ceramics of our invention and the method of their preparation in terms of specific Examples, we understand that these are meant purely to illustrate or explain and not to impose limitations upon the invention, since a variety of modifications or variations will readily occur to the ceramics specialist on the basis of this disclosure. The following is a brief list of such modifications and variations:

1. The insulating substances PbO, $Bi_2O_3$ and $B_2O_3$ may not necessarily be used as starting substances in the manufacture of the boundary layer ceramics in accordance with our invention, all that is required being that they exist as such in the intergranular boundaries of the completed ceramics. Other substances may therefore be adopted as well, only if they become PbO, $Bi_2O_3$ and $B_2O_3$ on being heated for diffusion in the intergranular boundaries. Examples include red lead oxide ($Pb_3O_4$), lead fluoride ($PbF_2$), lead borate ($Pb(BO_2)_2 \cdot H_2O$), and bismuth trifluoride ($BiF_2$).

2. As another method of diffusing the insulating substances in the intergranular boundaries, there may be prepared a mixture of substances that will be thermally converted into PbO, $Bi_2O_3$ and $B_2O_3$ in the desired ranges of proportions. This mixture may be fired at, for instance, 1000° C. to provide the required insulating substances, then pulverized, pasted, and coated on uninsulated ceramic bodies.

3. The insulating substances may not necessarily be coated on uninsulated ceramic bodies but may be otherwise layered thereon as by vacuum deposition or by immersion of the bodies therein.

4. The primary ingredients $SrTiO_3$, $Nb_2O_5$ and CuO and the auxiliary ingredients $SiO_2$ and $Al_2O_3$ are also required to exist as such only in the completed ceramics; starting substances may be different. Thus, for example, strontium carbonate and titanium oxide may be used as starting substances to provide $SrTiO_3$ in the completed ceramics.

Additional modifications and variations of our invention may be resorted to without departing from the scope of the appended claims.

We claim:

1. An insulated boundary layer ceramic having primary and secondary ingredients forming in combination a polycrystalline ceramic proper, and insulating substances dispersed throughout the intergranular boundaries of the ceramic proper, the primary ingredients consisting essentially of, in relative proportions, from about 93.18 to about 99.85 percent by weight $SrTiO_3$, from about 0.13 to about 5.32 percent by weight $Nb_2O_5$, and from about 0.02 to about 1.50 percent by weight CuO, the secondary ingredients consisting essentially of from about 0.02 to about 0.10 part by weight $SiO_2$ and from about 0.01 to about 0.03 part by weight $Al_2O_3$ with respect to 100 parts by weight of the primary ingredients, the ratio in weight of $SiO_2$ to $Al_2O_3$ being from about 1.5 to about 5.0, and the insulating substances consisting essentially of from about 0.03 to about 2.75 percent by weight PbO, from about 0.12 to about 4.23 percent by weight $Bi_2O_3$, and from about 0.001 to about 0.18 percent by weight $B_2O_3$, the percentages of the insulating substances being all with respect to the total weight of the primary and the secondary ingredients.

* * * * *